UNITED STATES PATENT OFFICE.

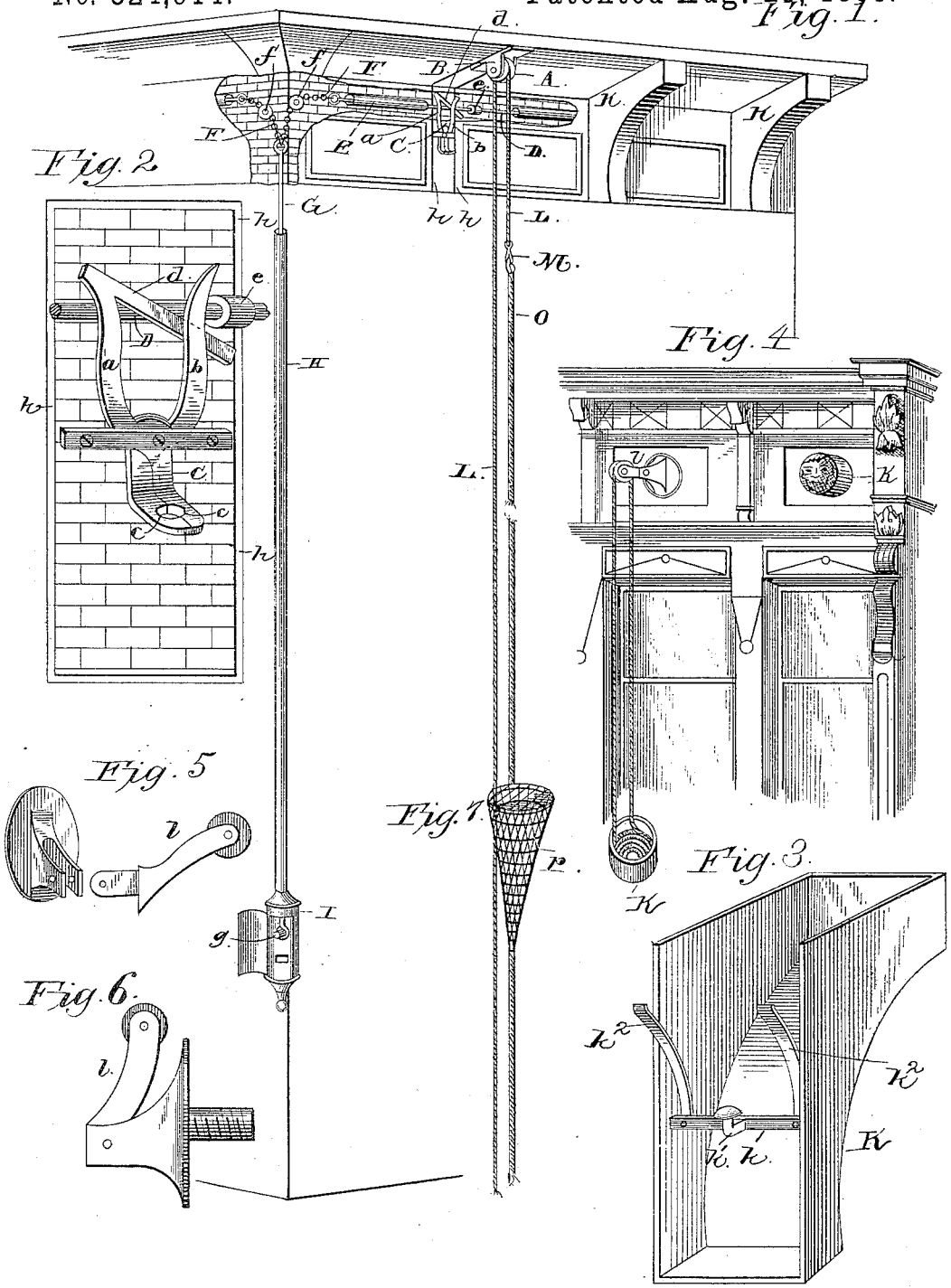

EDWARD HENRY BERGMANN, OF CIMARRON, TERRITORY OF NEW MEXICO.

FIRE-ESCAPE.

SPECIFICATION forming part of Letters Patent No. 324,914, dated August 25, 1885.

Application filed June 3, 1885. (No model.)

*To all whom it may concern:*

Be it known that I, EDWARD H. BERGMANN, a citizen of the United States, residing at Cimarron, in the county of Colfax, Territory of New Mexico, have invented a new and useful Improvement in Fire-Escapes, of which the following is a specification, reference being had to the accompanying drawings.

My invention relates to an improvement in fire-escapes; and it consists in the peculiar construction and combination of devices that will be more fully set forth hereinafter, and particularly pointed out in the claims.

In the accompanying drawings, Figure 1 is a perspective view of a portion of a building with my fire escape apparatus attached thereto. Figs. 2 and 3 are detailed perspective views. Fig. 4 is a detailed perspective view of a portion of a building with a slightly-modified form of my fire-escape applied thereto. Figs. 5, 6, and 7 are detailed perspective views.

A represents a series of sheaves journaled in brackets B, that are adapted to be attached permanently to the walls or under the eaves or cornices of a building. To the walls of the building, under the eaves or cornice thereof, are secured a number of grapples, C, there being one for each sheave. These grapples are composed each of the fulcrumed levers $a$ $b$, having their lower ends bent out at right angles and recessed on their inner opposing edges, as at $c$. From one side of the lever $a$, at the upper end thereof, extends an inclined bar, $d$, that extends behind the upper end of the lever $b$, as shown at Figs. 1 and 2.

D represents an endwise moving rod that is inclosed in a tube, E, of suitable diameter, the tube being preferably incased in the wall of the building in rear of the grapples. The tube and rod are formed in sections of length corresponding to the distance between the grapples, the sections of the rod being secured together by screw-couplings. Bosses or studs $e$ are provided for the rod adjacent to the levers of the grapples. As shown at Fig. 1, the rod D passes along the walls of the building, and at each corner thereof the sections of the rod are joined by a chain, F, which passes over sheaves $f$. The central portion of this connecting-chain forms a depending loop that is passed through an eye at the upper end of a vertical rod, G, that is similar to the rod D and is inclosed in a tube, H, that is preferably incased in the walls of the building at the corner thereof. The lower end of the rod G passes into a box, I, that is secured to the corner of the building, preferably about seven feet from the ground, and has an eye formed in its lower end, through which passes a pin, $g$, that enters an opening in the side of the box and serves to support the weight of the vertical rod.

K represents a series of boxes or cases, which are made in imitation of the brackets, cantilevers, or projects of the building, to which my fire-escape apparatus is applied, so as to not in any way mar or impair the architectural beauty of the building, and so as to entirely conceal the apparatus from view. These boxes or cases are open on their rear and upper sides and are adapted to fit over the brackets and sheaves, so as to hide them from observation and protect them from atmospheric influences.

In order to secure these boxes or cases in place, shallow grooves or recesses $h$ are made in the walls and cornices or eaves to receive and steady the rear and upper sides of the boxes or cases, and the latter are provided with transverse bars $k$, rearwardly from the centers of which project headed studs $k'$, adapted to be retained and clamped in the recesses $c$, formed between the lower ends of the levers of the grapples. Flat bearing-springs $k^2$ are also secured to the transverse bars $k$, and bear against the walls at their free ends. The function of these springs is to move the boxes or cases forward out of engagement with the clutches when the lower ends of the levers of the latter are opened, and the boxes or cases will then fall by their own gravity. Strong, light cords or ropes L pass over the sheaves A, the depending ends of these ropes being long enough to reach the ground, each rope L then being equal in length to twice the height of the building. Snap-hooks M are attached to the ends of the cords or ropes L. The ropes L are coiled carefully, leaving the ends projecting from each coil, and these coils are inclosed in the boxes or cases K, out of sight. In the event of a fire in the building the box I will be opened and the pin $g$ drawn out from the lower eye of the vertical rod, which rod then drops a short distance by its own weight, and with sufficient force to move the rods D, and cause the studs thereof to strike against the levers of the grapples and release the boxes or cases K, which fall to the ground and uncoil the ropes L. Heavy ropes O are then hooked to the ropes L, and drawn over the sheaves. These ropes O are provided with suitable eyes or loops to serve as a means for the ready attachment of baskets P, which may be formed of rope or any preferred material, and will serve as a means for the escape of persons in the building, and for lowering valuables therefrom.

In Figs. 5 and 6 I show a modified form of bracket to be used where the ornaments or projections of the building do not extend sufficiently far to admit of boxes or cases of sufficient size to cover the sheaves and brackets. This modified form of bracket has a hinged extending arm, $l$, to the outer end of which is journaled the sheave. This arm is thereby adapted to be folded into a small space, and thus permit the covers or boxes to be made to correspond to the trimmings of the building.

The operating parts of my fire-escape will be made of galvanized iron, zinc, or other material that will withstand the action of the elements without rusting, and the ropes and baskets will be impregnated with a suitable fire-proof composition. The key to the box, the working-ropes O, and the baskets, it is contemplated, will be furnished to and kept in charge of the fire-department, and duplicates of the same may also be kept in a conspicuous place in the building to which the apparatus is attached.

Having thus described my invention, I claim—

1. The combination of the brackets having the sheaves, the removable boxes or cases for covering the brackets and sheaves, the grapples having the fulcrumed levers for securing the boxes or cases to the building, the ropes L on the sheaves and coiled in the boxes or cases, and the endwise-moving rod having the studs engaging with the levers of the grapples for releasing the boxes or cases, and the device for moving the rod, substantially as described.

2. The combination of the brackets having the sheaves, the boxes or cases K, having the springs and the studs $k'$, the grapples having the fulcrumed levers for clamping the studs $k'$, and the endwise-moving rod having the studs or bosses $e$, and means for moving the rod to trip the levers of the grapples and the ropes L on the sheaves and coiled in the boxes or cases, substantially as described.

3. The combination of the brackets having the sheaves, the boxes or cases K, the grapples having the levers $a\ b$, for securing the boxes or cases, the rod D, having the bosses or studs, and formed in sections joined by the chain F, passing over sheaves $f$, the vertical rod G, secured to the chain, and a pin for supporting the rod G, substantially as described.

4. The combination of the brackets having the sheaves, the boxes or cases, the grapples having the levers $a\ b$, for securing the boxes or cases, the tube E, the endwise-moving rod D in the tube and having studs or bosses for tripping the levers, means for moving said rod, and the ropes L on the sheaves, adapted to be coiled in the boxes or cases, substantially as described.

In testimony that I claim the foregoing as my own I have hereto affixed my signature in presence of two witnesses.

EDWARD HENRY BERGMANN.

Witnesses:
J. M. WALASON,
VAN ZEIGLER.